W. C. BRINTON.
MOTOR VEHICLE.
APPLICATION FILED AUG. 26, 1916.
1,313,937.
Patented Aug. 26, 1919.
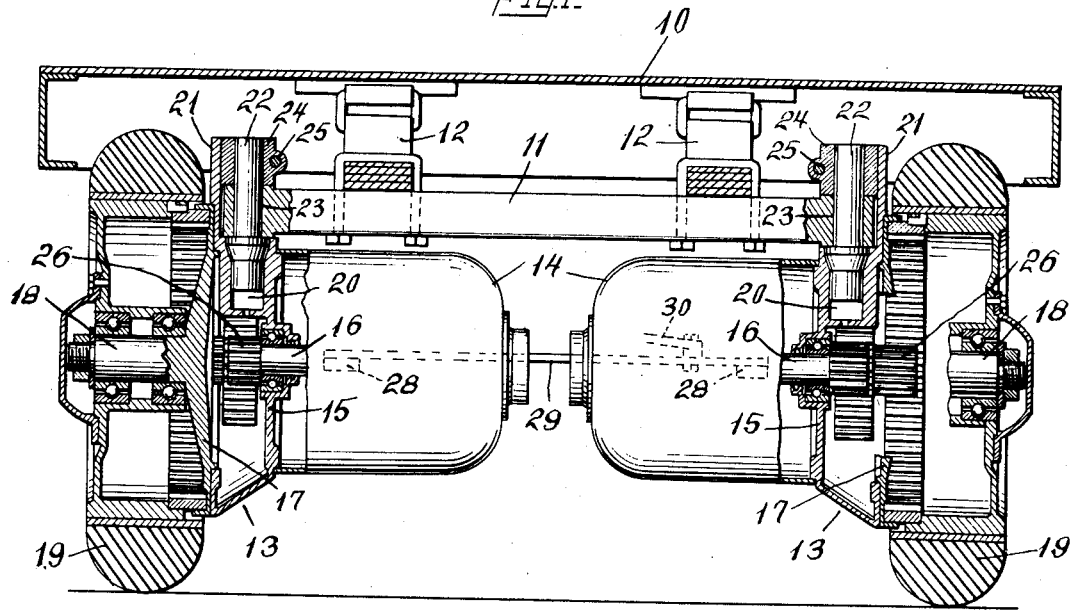
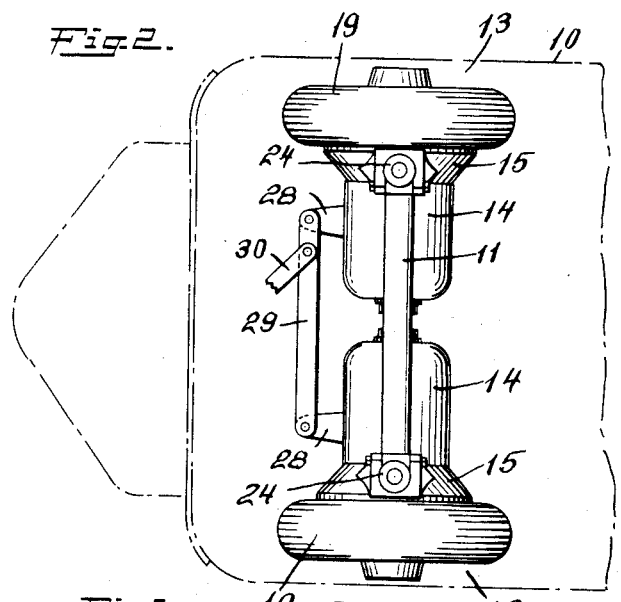
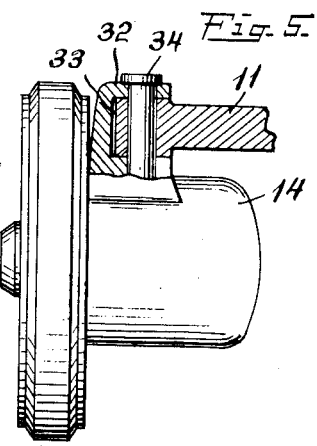
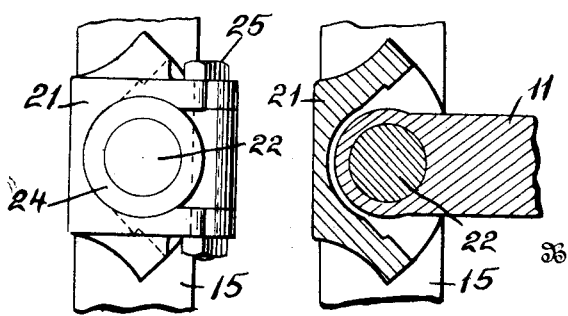
Inventor
Willard C. Brinton
By his Attorney

UNITED STATES PATENT OFFICE.

WILLARD C. BRINTON, OF NEW YORK, N. Y.

MOTOR-VEHICLE.

1,313,937. Specification of Letters Patent. Patented Aug. 26, 1919.

Application filed August 26, 1916. Serial No. 117,032.

*To all whom it may concern:*

Be it known that I, WILLARD C. BRINTON, a citizen of the United States of America, and a resident of New York, county and State of New York, have invented certain new and useful Improvements in Motor-Vehicles, of which the following is a specification, reference being had to the accompanying drawings, forming a part thereof.

My invention relates to motor vehicles, and has special reference to such as are equipped with driving wheels of relatively small size and are required to develop considerable power.

One object of my invention is to provide a motor wheel or motor wheel truck arranged to permit the turning of the wheels about vertical axes for steering and enable a driving motor to be utilized which is large relative to the size of the wheel which it drives and which entirely avoids projections or obstructions below the motor, such as have usually limited the size of the motor because of the clearance necessarily maintained between the mechanism between the wheels and the roadway.

Another object is to provide a wheel motor having an axle projection and an operative connection between the wheel and the motor, and a trunnion bracket above the motor for pivotally connecting the motor wheel as a unit, with a transverse axle bar which is above the axis of the wheel.

Still another object is to provide a trunnion structure for a wheel motor of the character above indicated, that shall permit the motor wheel to be expeditiously connected or detached from the axle bar.

Other objects and advantages of my invention will be set forth hereinafter, and in order that my invention may be thoroughly understood I will now proceed to describe the same in the following specification, and then point out the novel features thereof in appended claims.

Referring to the drawings:

Figure 1 is a partially sectional elevation of a vehicle truck arranged and constructed in accordance with my invention and constituting an embodiment thereof.

Fig. 2 is a partial plan view drawn to a smaller scale, of one end of the vehicle showing the truck of Fig. 1.

Figs. 3 and 4 are respectively a plan view and a sectional plan view of the trunnion connection between the motor frame and the axle bar, drawn to a relatively larger scale.

Fig. 5 is a fragmentary view showing in sectional elevation, another form of wheel motor connection.

In Figs. 1 to 4 inclusive,—10 designates the platform or body of a motor truck, and 11 a transverse axle bar, to which the body springs 12 are secured. A pair of motor wheels 13 are pivotally mounted at the respective ends of the axle bar 11 and are similar to each other.

Each motor wheel structure comprises a motor frame 14 having a bearing bracket 15, a shaft 16 rotatable therein, a disk 17 having an axle projection 18, and a wheel 19 which is rotatively mounted on the axle projection.

The bearing bracket 15 which constitutes a part of the motor frame is formed to provide a socket 20 and extends upwardly to provide an open receptacle 21. A pivot pin 22 is mounted in the socket 20 and extends upwardly through a suitable hole 23 in the axle bar 11 within the receptacle 21. In the upper part of the receptacle is a trunnion block 24 which is held in place by a transverse bolt 25.

The motor is operatively connected to the wheel by a suitable gearing such as indicated at 26, and special attention is directed to the fact that each wheel and motor constitutes a unit which is connected to a single axis bar 11 in such a way as to permit the wheel motor unit to swing on the trunnion pin as a pivot for steering while the driving connection is efficiently maintained at all times,—no lost motion or universal joint connection being employed.

By the use of the structure above described, I am able to secure a very marked advantage which will immediately appeal to those skilled in this art, on account of the fact that there is no projection from the motor frame, or connection between the motors on the underside, the space between the body of the motor and the roadway being unobstructed. This unobstructed space must necessarily be maintained at a predetermined minimum, regardless of the structure employed and hence by the use of my invention the motor may be relatively large while at the same time its axis is coincident with the axis of the wheel.

The wheel motor units may be connected in any suitable manner for steering; for example, as shown in outline in Fig. 2, the motor frames are preferably provided with lugs 28 which are connected by a link 29 between the units. An actuating member 30 is connected to the link 29.

The trunnion structure above described, is particularly advantageous because the trunnion block 24 may be readily removed and when removed the body and axle bar may be jacked up slightly and the unit removed for inspection or repairs; in fact, if this arrangement is employed in a vehicle comprising four similar driving units, it is only necessary to carry one spare unit in order to permit the device to be kept in repair easily without removing it from service for any considerable period of time.

A modified arrangement is shown in Fig. 5, according to which the motor frame 14 is provided with a complete trunnion projection 32 which is preferably integral and has a socket 33 to receive the end of the axle bar 11, the bar being connected to the trunnion by a pivot pin 34.

My invention is well adapted for use in a freight-handling truck such as that shown and described in my copending application Serial No. 802,192, filed Nov. 21, 1913, but its field of usefulness is by no means limited in this regard, and I intend that only such limitations be imposed as are indicated in the appended claims.

What I claim is:

1. In a vehicle, the combination of a wheel motor comprising a substantially horizontal motor shaft and a frame having a single trunnion projection at the top, and a rigid shaft projection coaxial with the motor shaft constituting a wheel axle, a wheel mounted on the axle and geared to the motor shaft and a single axle bar pivotally connected to said trunnion projection and adapted to support the vehicle body whereby the motor frame may be large relative to the size of the wheel.

2. A vehicle truck comprising an axle bar, a pair of motors each having a socket and a receptacle projection extending upwardly therefrom, a trunnion pin mounted in the socket and extending upwardly through one end of the axle bar within the receptacle, and a trunnion block removably secured to the receptacle above the axle bar, and a wheel operatively connected and secured to the motor.

3. A motor wheel for vehicles comprising a shaft, a frame having a trunnion projection on the top and an axle projection at one end coaxial with the motor shaft, a wheel mounted on the axle projection, an operative connection between the motor and the wheel, and an axle bar above the motor pivotally connected to the trunnion projection.

4. A vehicle truck comprising a pair of driving wheels, independent motors having motor shafts and axle projections beyond the motor shafts and coaxial therewith for the wheels and means for operatively connecting the motor shaft to the respective wheels, a single axle bar above the motors, and trunnion projections extending upwardly from the motor frames and pivotally connected to the axle bar.

In witness whereof I have hereunto set my hand this 24th day of August, 1916.

WILLARD C. BRINTON.